United States Patent [19]

Matsuzaki et al.

[11] Patent Number: 5,018,219
[45] Date of Patent: May 21, 1991

[54] OBJECT RECOGNIZE APPARATUS

[75] Inventors: Kichie Matsuzaki, Yokohama; Mitsunobu Isobe, Machida; Kenzo Takeichi, Tochigi; Ryouichi Hisatomi, Tochigi; Masasi Kudou, Tochigi, all of Japan

[73] Assignee: Hitachi, Ltd., Tokyo, Japan

[21] Appl. No.: 306,397

[22] Filed: Feb. 6, 1989

[30] Foreign Application Priority Data

Feb. 29, 1988 [JP] Japan .................. 63-44412
Aug. 26, 1988 [JP] Japan .................. 63-210708

[51] Int. Cl.$^5$ ............................ G06K 9/00
[52] U.S. Cl. ............................ 382/37; 382/8; 382/19
[58] Field of Search .......... 382/19, 8, 21, 25, 28, 382/38, 37, 48, 22; 364/200

[56] References Cited

U.S. PATENT DOCUMENTS 4,325,120  4/1982  Colley et al. .................. 364/200
4,731,856  3/1988  Lloyd et al. .................. 382/37
4,803,735  2/1989  Nishida et al. ................ 382/8

Primary Examiner—David K. Moore
Assistant Examiner—Tan Dinh
Attorney, Agent, or Firm—Antonelli, Terry, Stout & Kraus

[57] ABSTRACT

An object recognize apparatus suitable for recognition of a complex object constituted with a plurality of elements. When specifying a recognition object, a plurality of elements constituting the finally required recognition object are respectively designated as recognition objects, and when specifying an upper-level recognition object, lower-level recognition objects thereof are designated. Furthermore, for each lower-level recognition object, geometric features necessary for the recognition are specified. In an analysis of image data, the lower-level recognition objects are first detected by use of the geometric features so as to next attain the upper-level recognition object based on results of the detection. As a result, a complex object existing at an arbitrary position can be judged and the position thereof is obtained.

4 Claims, 17 Drawing Sheets

```
*** LOWER LEVEL OBJECTS No. SETTING ***              1

LOWER LEVEL OBJECTS (TOTAL=2):2,3

.

OBJECT No.
```

FIG. 6(a)

PRIMARY OBJECT

| TYPE | NAME | CONTENTS | RECOGNITION RESULTS |
|---|---|---|---|
| SIMPLE | (1) PLANE OBJECT | PLANE OBJECT HAVING AREA. ARBITRARY SHAPE INCLUDING HOLE | POSITION OF SPECIFIED WORK POINT |
| | (2) LINE OBJECT | LINEAR OBJECTS SUCH AS EDGH AND GROOVE | VALUES OF GRADIENT AND INTERSECTION |
| | (3) POINT OBJECT | OBJECT AS A POINT, NOT FOR A DETERMINANT SHAPE. A TYPE OF PLANE OBJECT | CENTER POSITION |
| COMPLEX | (4) STRIPE OBJECT | OBJECT AS STRIDE | NUMBER OF STRIPE LINES CENTER POSITION |
| | (5) AMORPHOUS OBJECT | TOTAL AREA OF WHITE OR BLACK ZONE IN SPECIFIED REGION | PRESENCE /ABSENCE |

FIG. 6(b)

UPPER-LEVEL OBJECT

| NAME | CONTENTS | LOWER-LEVEL OBJECTS | RECOGNITION RESULTS |
|---|---|---|---|
| (6) COMPOUND OF TWO POINTS | LINE DEFINED BY PARTICULAR POINT OF TWO OBJECT | (1)(3)(4) | DISTANCE BETWEEN POINTS, GRADIENT, AND VALUE OF INTERSECTION |
| (7) COMPOUND OF POINT AND LINE | VERTICAL LINE FROM A PARTICULAR POINT OF AN OBJECT TO A LINE | (1)(3)(4) & (2)(6) | DISTANCE BETWEEN LINES AND POSITION OF INTERSECTION |
| (8) COMPOUND OF TWO LINES | INTERSECTION OF TWO POINTS OF DISTANCE THEREBETWEEN | (2)(6) | DISTANCE BETWEEN LINES AND POSITION OF INTERSECTION |
| (9) COMPOUND OF PLURAL OBJECTS | DEFINED BY PRESENCE/ABSENCE OF OBJECTS | (1)(2)(3) (4)(5)(6) (7)(8)(9) | PRESENCE /ABSENCE |

FIG. 9

| |
|---|
| OBJECT No.1 |
| NUMBER OF LOWER-LEVEL OBJECTS : 2 |
| LOWER-LEVEL OBJECT No.2 |
| CONDITION : PRESENT |
| LOWER-LEVEL OBJECT No.3 |
| CONDITION : PRESENT |
| OBJECT No.2 |
| NUMBER OF LOWER-LEVEL OBJECTS : 2 |
| LOWER-LEVEL OBJECT No.4 |
| CONDITION : PRESENT |
| LOWER-LEVEL OBJECT No.5 |
| CONDITION : PRESENT |
| OBJECT No.3 |
| NUMBER OF LOWER-LEVEL OBJECTS : 2 |
| LOWER-LEVEL OBJECT No.6 |
| CONDITION : PRESENT |
| LOWER-LEVEL OBJECT No.7 |
| CONDITION : PRESENT |
| OBJECT No.4 |
| NUMBER OF LOWER-LEVEL OBJECTS : 0 |
| PREPROCESSING METHOD : FIXED BINARY SEGMENTATION |
| RECOGNITION METHOD : FEATURE COMPARISON |
| FEATURES : AREA 4, PERIMETER 4 |
| OBJECT No.5 |
| NUMBER OF LOWER-LEVEL OBJECTS : 0 |
| PREPROCESSING METHOD : FIXED BINARY SEGMENTATION |
| RECOGNITION METHOD : FEATURE COMPARISON |
| FEATURES : AREA 5, PERIMETER 5 |
| OBJECT No.6 |
| NUMBER OF LOWER-LEVEL OBJECTS : 0 |
| PREPROCESSING METHOD : FIXED BINARY SEGMENTATION |
| RECOGNITION METHOD : FEATURE COMPARISON |
| FEATURES : AREA 6, PERIMETER 6 |
| OBJECT No.7 |
| NUMBER OF LOWER-LEVEL OBJECTS : 0 |
| PREPROCESSING METHOD : FIXED BINARY SEGMENTATION |
| RECOGNITION METHOD : FEATURE COMPARISON |
| FEATURES : AREA 7, PERIMETER 7 |

Right side labels (top to bottom): SWITCH PANEL — SWITCH 1 — SWITCH 2 — MARK A — MARK B — MARK C — MARK D

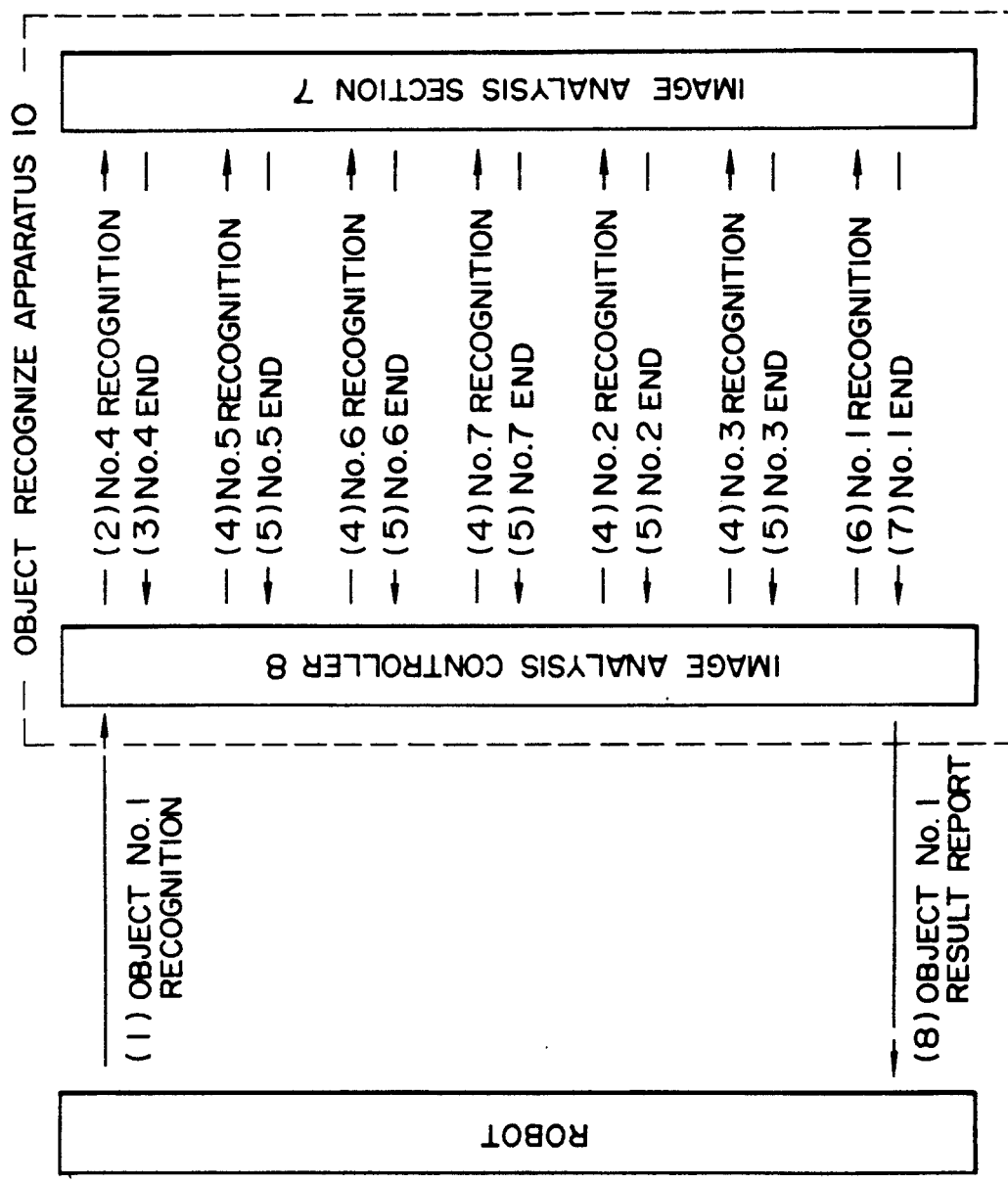

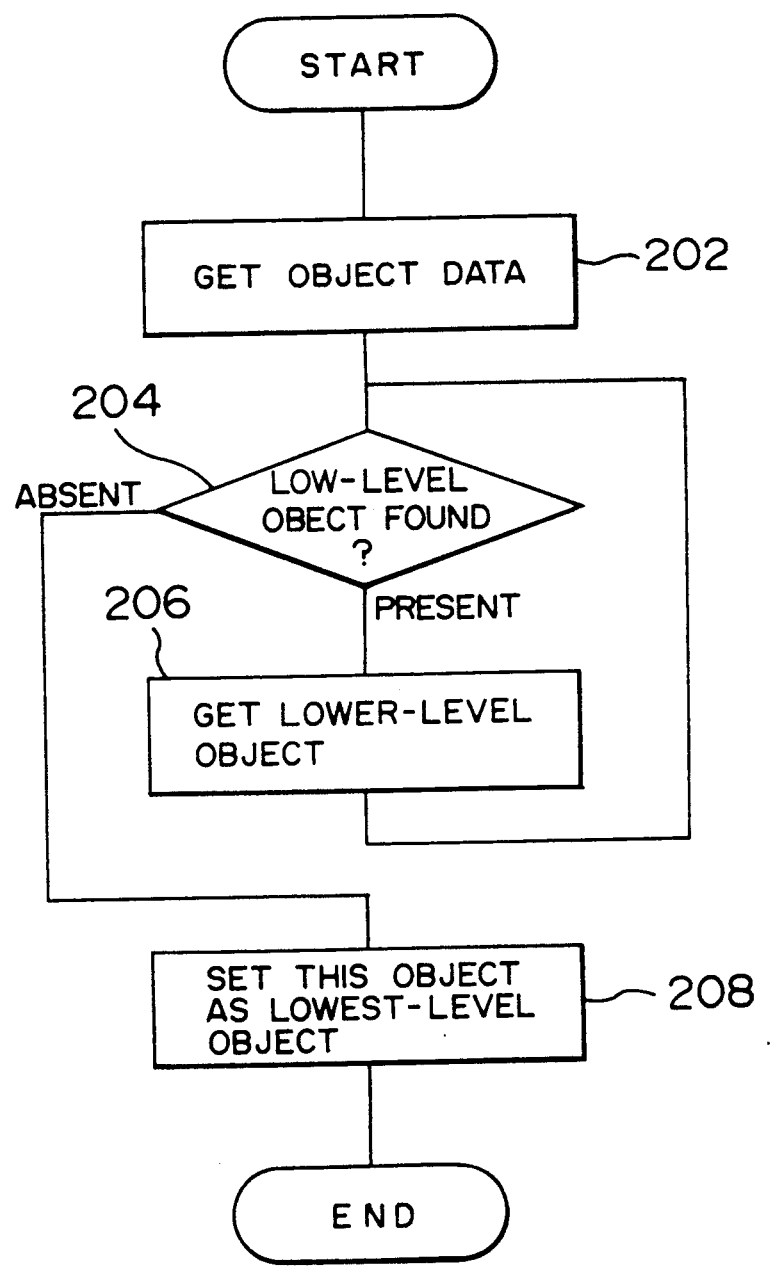

FIG. 15

| TYPE | EXAMPLE | OBJECT DESCRIPTION EXAMPLE |
|---|---|---|
| (1) | · RECOGNITION OF PARTS ON BOARD OR CHASSIS | EXAMPLE 1 {OBJECT 1 (TYPE: COMPOUND OF TWO POINTS) (LOWER-LEVEL OBJECT: 2,3); OBJECT 2 (TYPE: POINT OBJECT); OBJECT 3 (TYPE: POINT OBJECT)} |
| (2) | · DETECTION OF MARKS FOR POSITIONING | EXAMPLE 2 {OBJECT 1 (TYPE: COMPOUND OF TWO POINTS) (LOWER-LEVEL OBJECT: 2,3); OBJECT 2 (TYPE: CONFIGURATION OF TWO POINTS) (LOWER-LEVEL OBJECT: 4,5); OBJECT 3 (TYPE: CONFIGURATION OF TWO POINTS) (LOWER-LEVEL OBJECT: 6,7); OBJECT 4 (TYPE: STRIPE OBJECT); OBJECT 5 (TYPE: STRIPE OBJECT); OBJECT 6 (TYPE: STRIPE OBJECT); OBJECT 7 (TYPE: STRIPE OBJECT)} |
| (3) | · LIQUID SURFACE MEASUREMENT · MEASUREMENT OF LENGHT OF ELONGATED OBJECT · MEASUREMENT OF WIDTH OF BAND-LIKE OBJECT · READING OF VALUE OF METER | EXAMPLE 3 {OBJECT 1 (TYPE: COMPOUND OF TWO POINTS) (LOWER-LEVEL OBJECT: 2,3); OBJECT 2 (TYPE: LINE OBJECT); OBJECT 3 (TYPE: LINE OBJECT)} |
| (4) | · READING PRINT ITEM NUMBER · READING OF 7-SEGMENT CHRACTER · JUDGEMENT OF TYPES OF ELECTRONIC PARTS | EXAMPLE 4 {OBJECT 1 (TYPE: COMPOUND OF PLURAL OBJECTS) (LOWER-LEVEL OBJECT: 2,3,4,5,6,7,8); OBJECT 2 (TYPE: AMORPHOUS OBJECT); OBJECT 3 (TYPE: AMORPHOUS OBJECT); OBJECT 4 (TYPE: AMORPHOUS OBJECT); ...} |

OBJECT RECOGNIZE APPARATUS

BACKGROUND OF THE INVENTION

The present invention relates to an object recognize apparatus for recognizing items such as a type and a position of parts, and in particular, to an object recognize apparatus suitable for recognizing a complicated object (a pattern, a mark, or the like) including a plurality of components.

In the conventional apparatuses, there have been an apparatus as described in the JP-A-62-86471 (U.S. patent application No. 917,053) in which in a case where a range in which an object to be recognized exists is approximately determined, positions of a plurality of characteristic portions thereof are detected to combine the positions so as to detect the position of the entire object to be recognized and an apparatus as described in the JP-A-58-134372 in which also in a case where a range in which an object to be checked exists is approximately determined, a window area is set to a characteristic portion of the object to be checked so as to judge acceptance or rejection of a pattern of the object based on the characteristic quantity of the window area obtained as a binary value of the image. Furthermore, in an apparatus as described in the JP-A-59-154574 (U.S. patent application No. 582,555) for recognizing an object taking an arbitrary position and an arbitrary, attitude, a contour of each area associated with black and white generated by binarizing image data is compared with a contour of a recognition object beforehand specified so as to detect the object to be recognized.

According to the related art technology above, the detection of the object is possible when the position of the object is approximately determined or in a simple case where the object exists in an area; however, considerations have not been given to cases where the position of the object is not determined and the contour is complicated such that a plurality of areas are obtained when the binarization is achieved, which leads to a problem that such an object cannot be recognized.

SUMMARY OF THE INVENTION

It is therefore an object of the present invention to provide an object recognize apparatus for detecting a type and a position of an object which is to be located at an arbitrary position and which has a complex contour, namely, which is separated into a plurality of areas through the binarization.

Another object of the present invention is to provide an object recognize apparatus which enables a job to specify a complex object as a recognition object to be easily accomplished.

Another object of the present invention is to provide an object recognize apparatus which enables a job to recognize a complex object specified as a recognition object to be executed at a high speed.

For the objects above, when specifying a recognition object, a plurality of elements constituting a recognition object to be finally necessary (to be referred to as a high-level recognition object herebelow) are set as recognition objects (to be referred to as low-level recognition objects herebelow) such that when the high-level recognition object is specified, the low-level recognition objects thereof are specified and geometrically characteristic quantities necessary for the recognition are specified for the respective low-level recognition objects. Moreover, in an analysis of image data, low-level recognition objects are first detected by use of the geometrically characteristic quantities and then the high-level recognition object is detected depending on the results of the detection so as to judge a complicated object existing at an arbitrary position and to determine the position.

Furthermore, the objects above are achieved as follows. When specifying a recognition object in an interactive fashion, depending on a type of the object, the operation is automatically set to a mode to input necessary specification items, and in addition to the interactive input, it is possible to input a portion of data specifying the recognition object through a communication line or a storage.

Furthermore, the objects above are achieved by selectively employing a plurality of image analyze means depending on an input image.

In the configuration above, even for a complex object for which a plurality of regions are attained through the binarization, the recognize operation is first achieved for each region so as to analyze the results of the recognition, thereby recognizing the entire object having the complicated contour. In this operation, the structures of the respective regions of the object are analyzed so as to sequentially recognize the recognition objects beginning from the lower-most level; in consequence, before the recognition to be achieved at the higher level, the results of recognition on the lower-level objects are obtained, which enables a hierarchic recognition to be effected.

In addition, when specifying a recognition object, for each type of the object, a mark indicating the necessity/unnecessity is assigned to each specification items of the object such that only an input screen including specification items assigned with the necessity mark is displayed, which omits input screens including unnecessary specification items and hence simplifies the specification of the recognition object.

Furthermore, in a case where the values are beforehand determined for specification items, such values may be collectively supplied from a communication line or a storage so as to assign such items with marks indicating that the values are predetermined, which enables the input screens including the predetermined specification items to be omitted, thereby realizing an interactive input function only to supply the other specification items.

BRIEF DESCRIPTION OF THE DRAWINGS

The present invention will be apparent from the following detailed description taken in conjunction with the accompanying drawings in which:

FIG. 6 is a diagram showing kinds of objects;

FIG. 9 is a diagram showing object data associated with a switch panel of FIG. 10;

FIG. 13 is a diagram showing a command sequence between the image analyze controller and the image analyze section;

FIG. 14 is a diagram showing a processing procedure related to the overall object;

FIG. 15 is a diagram showing an example in which a high-level recognition object is specified by use of low-level recognition objects in a hierarchic manner;

DESCRIPTION OF THE PREFERRED EMBODIMENTS

Figure 1:
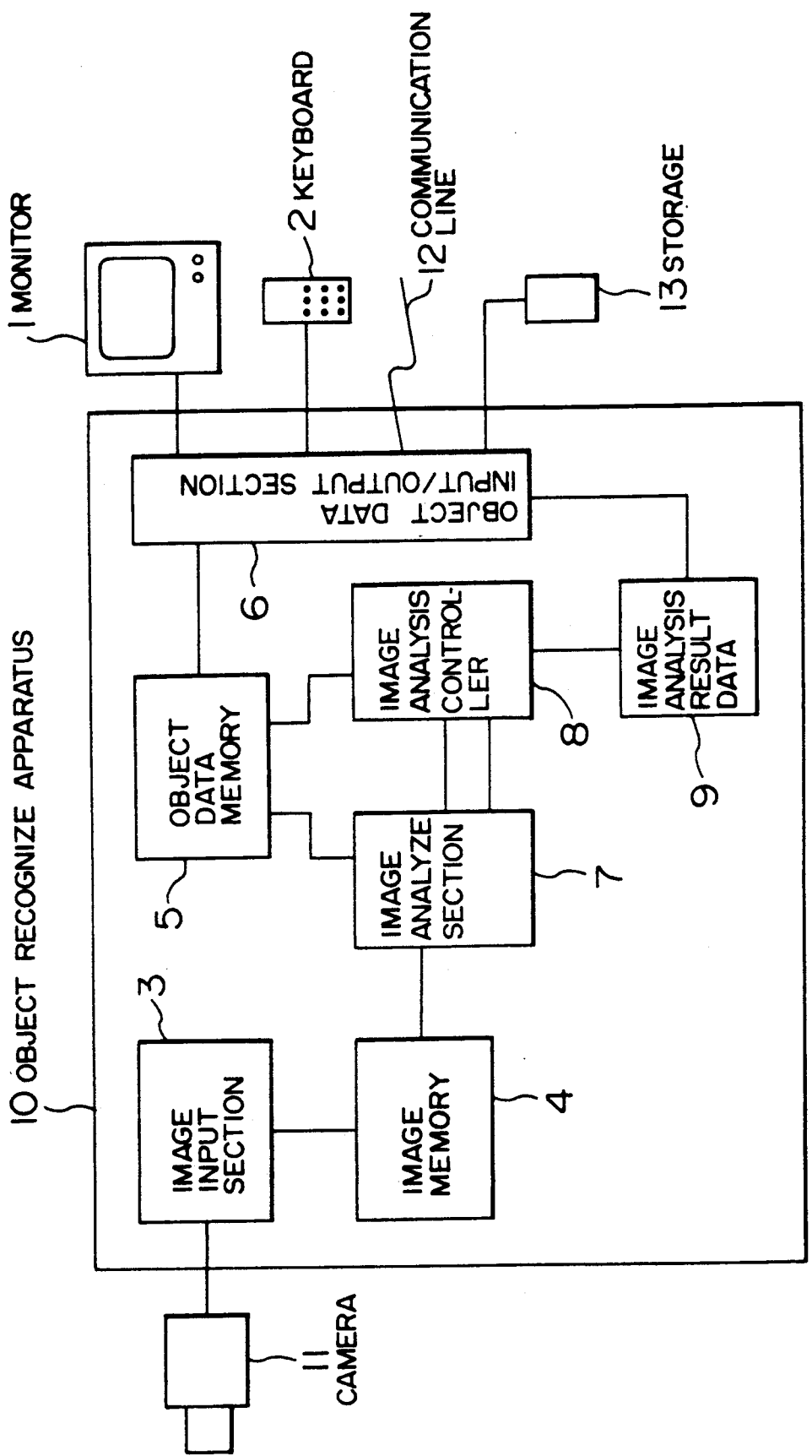
FIG. 1 is a schematic diagram showing an overall configuration of an embodiment according to the present invention.

Next, description will be given of an embodiment according to the present invention. FIG. 1 is a diagram showing the overall configuration of an embodiment according to the present invention. This object recognize apparatus 10 includes a monitor 1 for displaying an input indication screen for the user to specify an object to be recognized, a keyboard 2 for the user to input data of the recognition object, an image input section 3 for storing in an image memory 4 an image shot by a camera 11, an object data input/output section 6 connected to the monitor 1 and the keyboard 2 for displaying an input indication screen to the user, for storing in an object data memory 5 data of an object inputted by the user, and for displaying the result of an image analysis on the monitor 1, an image analysis controller 8 for referencing the data memory 5 storing the data of the recognition object so as to analyze the hierarchy of the object and for supplying an image analyze section 7 with object data beginning from the lower-most level object data, an image analyze section 7 for analyzing the input image, and an image analysis result memory 9 for storing the image analysis result. Incidentally, in addition to the monitor 1 and the keyboard 2, a communication line 12 and a storage 13 are connected to the object data input/output section 6 so as to input recognition object data therefrom and to output the image analysis result thereto.

The object data input/output section 6 and the image analysis controller 8 are implemented by use of a computer including programs which effect the functions to be described in this specification. In addition, the image analysis section is realized by means of a computer provided with an image processing program.

Figure 2:
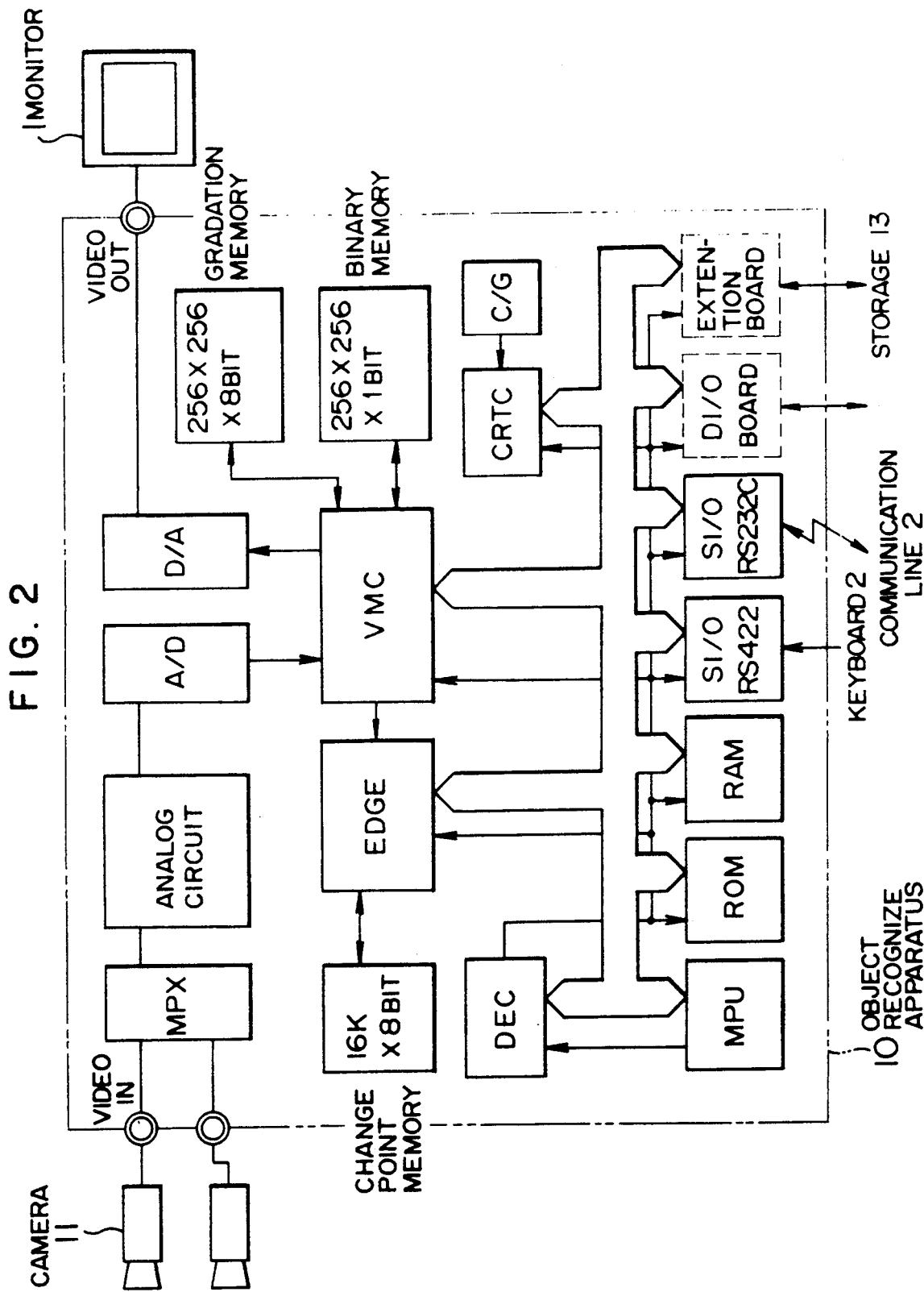
FIG. 2 is a circuit configuration diagram showing a concrete configuration of a circuit system according to the present invention.

FIG. 2 shows an example of a circuit construction implemented according to the configuration of FIG. 1.

In this system, a multiplexer (MPX), an analog circuit, and an analog-to-digital (A/D) converter constitute a concrete form of the image input section 3 of FIG. 1, and the image memory includes a gradation memory and a binary memory. A change point detect circuit (EDGE), a change point memory, and an image memory controller (VMC) form an image processing circuit constituting the image analyze section 7. Moreover, a micro-processor unit (MPU) executing the image processing program stored in a read-only memory (ROM) is also included in the image analyze section 7. Incidentally, the MPU also effects control functions in the object data input/output section 6 and the image analysis controller 8. A random access memory (RAM) is employed for the object data memory 5 and the image analysis result memory 9. An SI/O (RS422) is an interface circuit for the keyboard 2, and an SI/O (RS232C) board and a DI/O board form an interface circuit for the communication line 12, a D/A circuit, a CRT controller (CRTC), and a character generator (C/G) constitute an interface circuit for displaying images and characters on the monitor 1, and an expansion board is an interface circuit for the storage 13. These components form the object data input/output section 6. A signal decode (DEC) circuit is adopted to be used by the MPU to control these interface circuits.

Next, description will be given in detail of the object data input/output section 6 which enables the user to specify recognition objects with a set of lower-level recognition objects.

Figure 3:
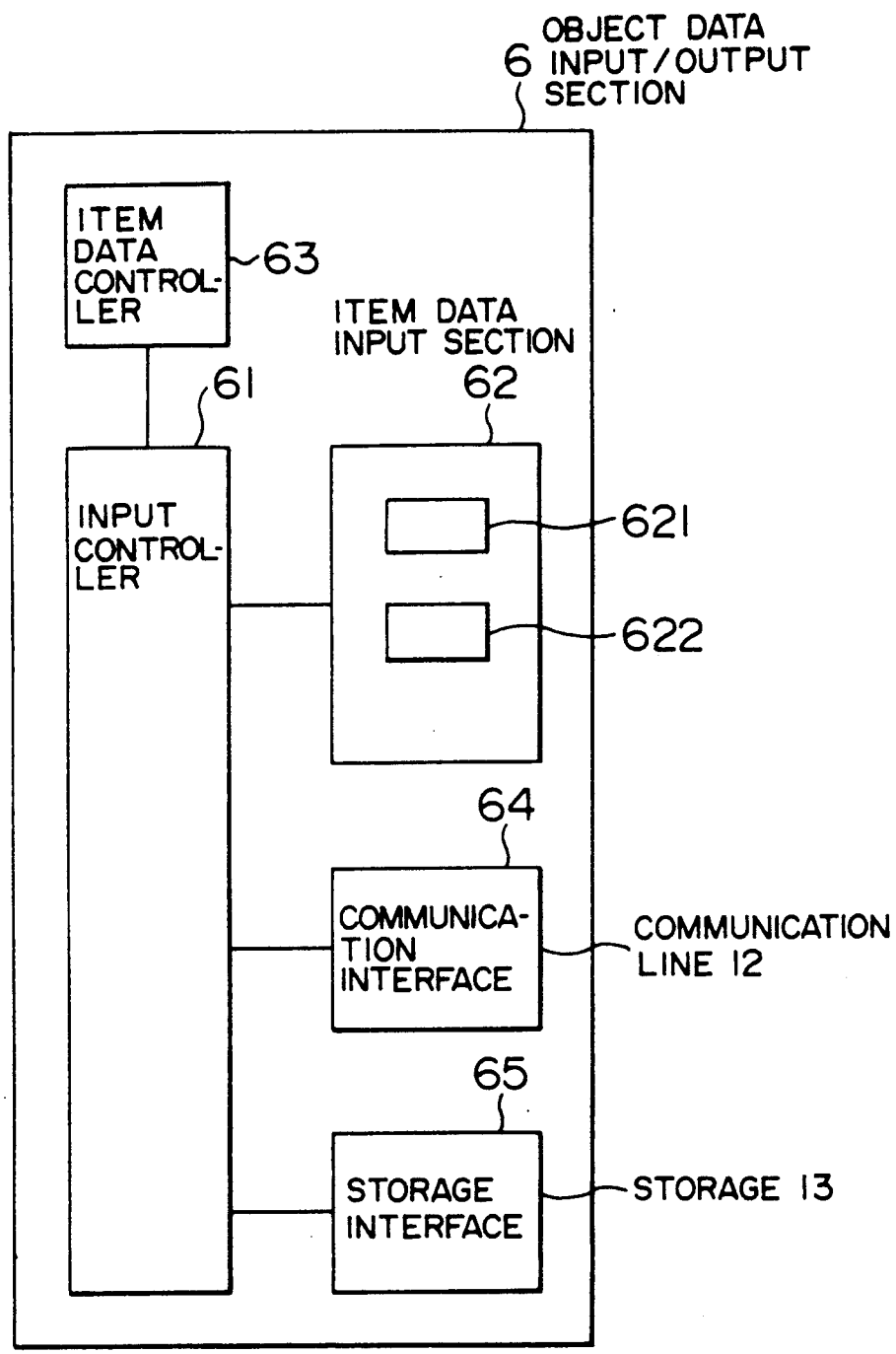
FIG. 3 is a diagram schematically showing the configuration of an object data input/output section 6.

FIG. 3 shows the configuration of the object data input/output section 6, which includes an input controller 61, an item data input section 62, an item data controller 63, a communication interface 64, and a storage interface 65. The input controller 61 controls the item data input section 62 so as to sequentially display on the monitor 1 menu screens to be used by the user to specify a recognition object and to receive data items supplied from the keyboard 2. The input controller 61, the item data input section 62, and the item data controller 63 are respectively implemented by use of the MPU and the programs stored in the ROM. Furthermore, the communication interface 64 is implemented with the SI/O (RS232C) board and the DI/O board, whereas the storage interface 65 corresponds to the extension board of FIG. 2.

Figures 4, 5:
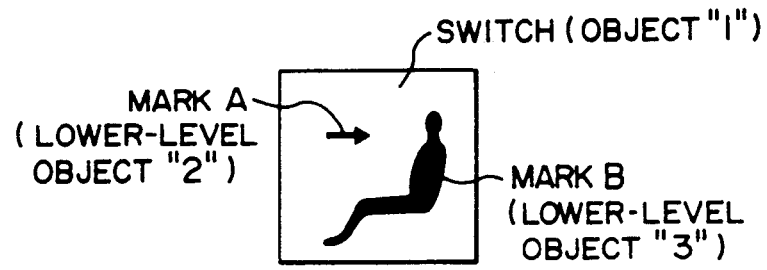
FIG. 4 is a diagram showing an example of a complex object constituted with a plurality of low-level objects.
FIG. 5 is a diagram showing an example of a low-level object specify menu.

FIG. 4 shows an example of a complex object constituted with a plurality of lower-level objects. This example is a switch having a mark A or B thereon so that the type of switch is judged by the mark A or B. The mark is constituted with shapes of separated areas, and hence in order to recognize the mark, the shape of each area constituting the mark is first recognized and then an analysis is conducted on a combination thereof.

In this case, the switch is the final recognition object and the respective marks are the lower-level objects.

When the switch is to be specified as a recognition object, the input controller 61 first causes an object number specify section 621 of the item data input section 62 to be executed so as to specify the object number, for example, "1". Subsequently, in order to specify the lower-level objects (for example, with "2" and "3") of this object, the lower-level object specify section 622 is executed so as to first display the lower-level object specify menu of FIG. 5. When the user specifies the lower-level object numbers in this menu, the switch as the object "1" is assumed to include the lower-level objects "2" and "3".

As described above, the user can specify a recognition object by use of a plurality of lower-level recognition objects.

Various types or kinds of objects may be specified as shown in FIG. 6. Namely, the objects includes primary or lowest-level objects as the lowest elements and higher-level or upper-level objects each to be defined by use of a combination of lowest-level objects. Moreover, the primary objects include a simple object constituted with a single area and a composite or compound object including a plurality of areas. These areas will be next described.

A plane object is a plane-like object having an area. This object may have an arbitrary shape and may include therein a hole. For this object, as described in the JP-A-59-154574 above, the position of a specified work point can be determined by use of a contour shape and features.

A line object is an object having a linear shape such as an edge or a groove. As the recognition results, there are computed values of the gradient or orientation of a direct line and the intersection.

A point object is an object having an area which has the smallest difference with respect to the specified value. The center position or centroid is attained as the recognition result.

A stripe object is a band-like object having a fixed width, for example, a lead line of an integrated circuit (IC). For such an object, the central position of the stripe thereof can be attained according to a method described in the JP-A-62-86789 (U.S. Pat application No. 179,983).

An amorphous object is an object not having a particular shape and is determined to be present if the total of the white or black area of a binary image in a specified range is not less than a specified value. The recognition result is "present" or "absent", namely, neither the position nor the type are attained.

A compound of two points is an object constituted with particular points of two objects. For example, for a part having two holes, the judgement thereof and the position detection can be achieved by recognizing the center of each hole. In consequence, assuming each hole to be a point object, this object is regarded as a higher level object including two point objects.

A compound of a point and a line is an object constituted with a line object and a point object. For example, the distance between a substrate hole and a substrate edge is defined as the distance between a line representing the edge and the center of the hole. Assuming here the edge and the hole to be objects, the distance between the edge and the hole is regarded as a compound object. These objects are upper-level objects constituted with points and lines.

A compound of two lines is an object including two lines. A corner of a rectangular substrate is defined as an intersection between two lines respectively representing a longitudinal edge and a transversal edge. Moreover, the width of a band-like object is defined as a distance between two lines as the edges of the both sides, respectively. These objects are upper-level objects including two lines.

A compound of a plurality of objects is an object defined by a combination of presence and absence of lower-level objects. For example, for a segment character of liquid crystal or the like, each segment may be assumed to be an amorphous object so as to judge the combination of presence and absence thereof. The objects above are upper-level objects each including a plurality of objects.

Incidentally, the upper-level objects may be set as lower-level objects of a higher-level object. That is, a two point compound may be regarded as a line object with the two points as the beginning and ending points, a compound of a point and a line may be handled as a line object defined by a perpendicular drawn from a point onto a line, and a compound of two lines may be treated as a point object defined by an intersection of two lines or a line object defined by the distance therebetween. As a result, the recognition object can be defined not only by use of two levels but also by use of arbitrary levels.

Figure 7:
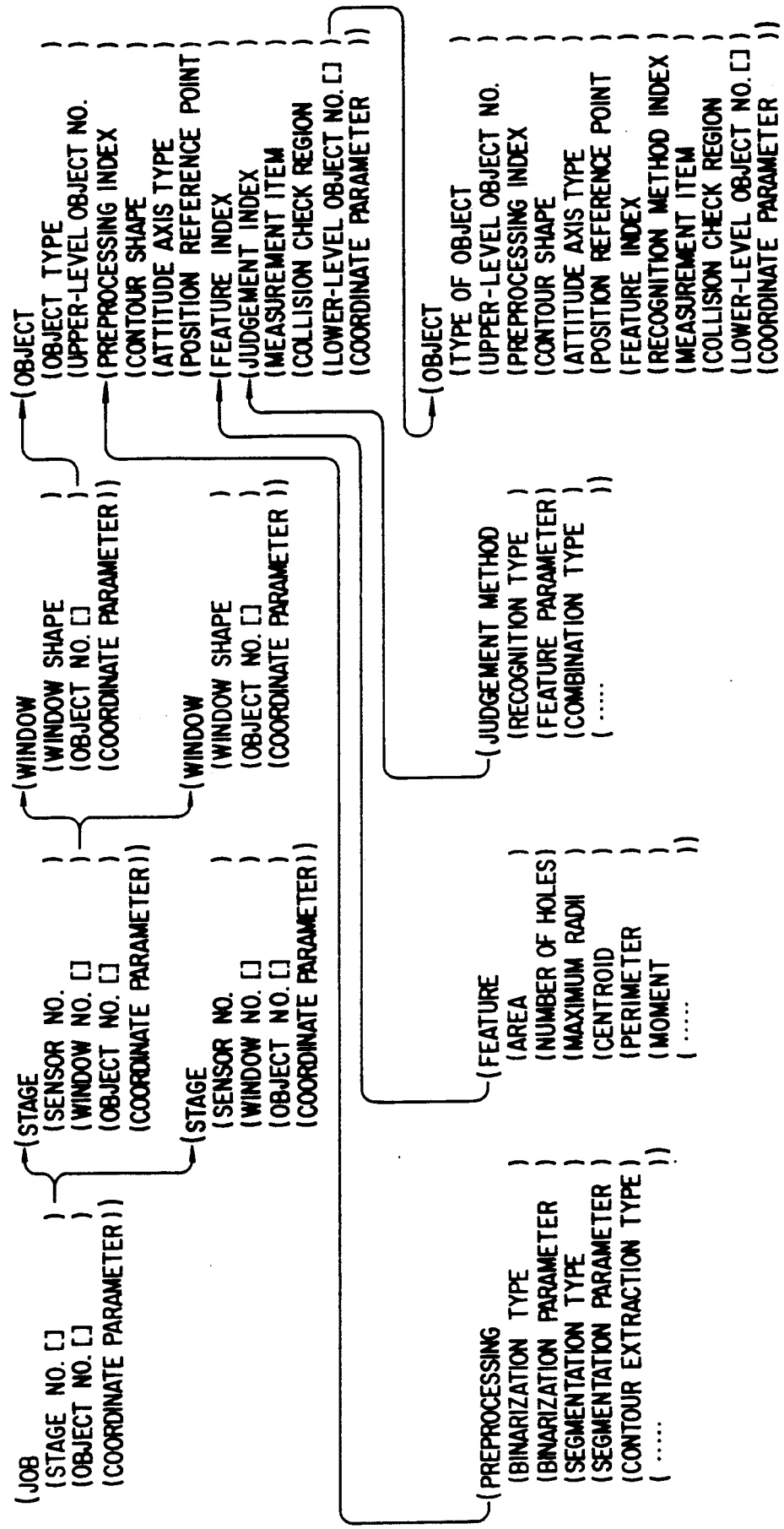
FIG. 7 is a diagram showing an example of object data.

Since this object recognize apparatus judges these objects to obtain the positions thereof, the contents of definitions of the objects include hierarchic relationships between the objects above, attributes of the objects, and the positions thereof. Data defining these objects are stored through the object data input/output section 6 in the object data memory 5 in a structure as shown in FIG. 7.

Among the data stored in the object data memory 5, data specifying the hierarchic relationships between the objects include, for each object, a type of object and an upper-level object number, the number of lower-level objects constituting the object, and the lower object numbers.

In addition, as attribute data to be employed when an object is recognized, there are stored the following items.

Preprocessing or lower-level processing: For the recognition, it is necessary to achieve preprocessing such as a noise elimination, a binarization or thresholding operation, and a segmentation. Since the content of preprocessing varies depending on the recognition object, the types and the sequence of the preprocessing are to be specified. In order to execute such preprocessing operations, there are required parameters, for example, a threshold value for binarization and a minimum segment area to be assumed as a noise. These parameters are also to be specified together with those above.

Contour shape: A contour shape as the basic item in a representation of an object is expressed with a polygon. Since an object includes a hole in some cases, the contour shape is expressed with n polygons in general. The information item is used, for example, in a contour comparison or matching.

Attitude axis type or orientation base: This item specifies a method of determining the attitude axis for defining the position and attitude of an object. This type item may be a principal axis, a line connecting a centroid to the farthest point, a line connecting a centroid to a center of a hole having the largest radius.

Position reference point or position base: This item specifies a point representing the position of an object. Features or characteristic quantities: Features of a shape such as an area and a perimeter can be employed for the judgement of an object. For this purpose, the features of a recognition objects are beforehand computed and are stored.

Judgement or matching method: Since an effective recognition algorithm also varies depending on the recognition object, this item specifies a recognition algorithm to be used.

Measurement items: The object recognize apparatus may be adopted for various usages, for example, to recognize positions of parts for an assembly and to measure dimensions of an object for an inspection, and hence the necessary recognition items also vary depending on the usage. Such necessary items are specified in this field.

Collision check: When a robot conducts an assembly operation, it is necessary to know the position of a part as well as a fact that there exists no obstacle in the Periphery of the part. For this purpose, it need only be achieved to specify a particular range so as to check to determine that there does not exist any obstacle in the range. As a result, it is possible to avoid a collision between a hand of the robot and an obstacle. This item specifies the range.

Coordinate conversion parameters: A position of an object is represented as follows. First, the shape of the object is defined in a coordinate system (an object coordinate system) inherent to the object, and then there are disposed coordinate conversion parameters for a coordinate conversion between the coordinate system representing an environment where the configuration object exists and the object coordinate system. This item specifies the coordinate conversion parameters.

The environment where the configuration object exists is expressed through three levels including the job, stage, and window levels. An object may exist at each level.

A job is a unit of work, whereas a job coordinate is a coordinate commonly applied to the entire job. In consequence, the coordinate can be regarded as a world coordinate for a work.

A stage is a range to be taken as an image at a time in a job, whereas a stage coordinate is a coordinate of the range. In general, the stage coordinate is defined in the job coordinate, and relationships between a plurality of stages can be obtained through a job coordinate where the stage coordinate is defined. The stage coordinate is effective in a case where the range for the image moves, for example, for the sense of sight of the robot hand and in a case where a plurality of cameras are employed to shoot respective portions of a huge object so as to thereafter recognize the entire object.

A window is a particular range in a stage and a window coordinate is a coordinate of the range. In general, since the window coordinate is defined in the stage coordinate, it is possible to attain relationships between positions of the windows. In a case where a zone in which an object to be recognized is restricted, the window ma be set in the periphery of the object to mask the periphery, thereby developing an effect to facilitate the recognition of the object. The window coordinate is utilized for the processing in the window.

In the example of FIG. 7, although objects are defined by use of windows, an object astriding a plurality of windows may be defined as a stage object and an object astriding a plurality of stages may be defined as a job object.

Figure 8:
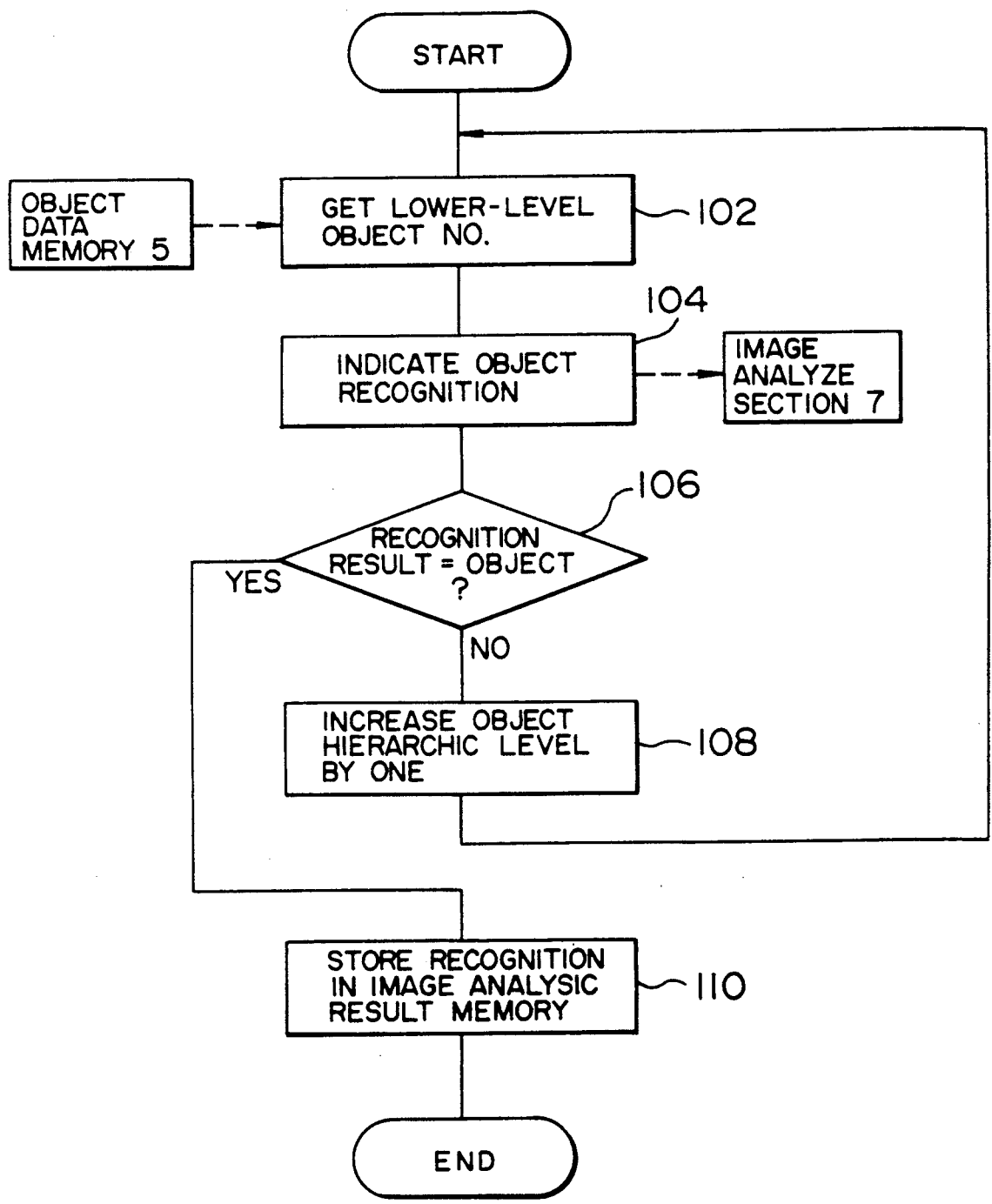
FIG. 8 is a diagram showing a processing procedure of an image analyze controller 8.
Figure 10:
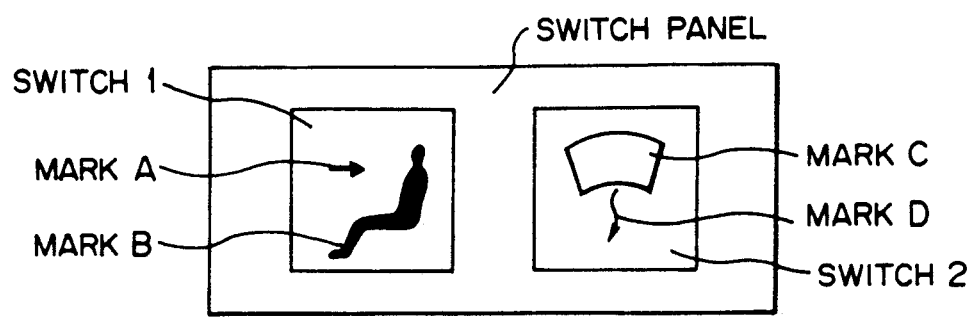
FIG. 10 is a diagram showing a switch panel related to an example of the object.

FIG. 8 shows a processing procedure of the image analysis controller 8, which analyzes data stored in the object data memory 5. FIG. 9 shows an example of object data stored in the object data memory 5. In this example, the switch panel (object number "1") of FIG. 10 is set as an object. This switch is associated with two switches (object numbers "2" and "3") and the respective switches have a plurality of marks A, B, C, and D (object numbers "4", "5", "6", and "7"). In consequence, the structure of object data includes marks as the lowest-level objects, switches as objects at the next higher level, and a switch panel as the highest-level object.

The image analysis controller 8 effects, when the switch panel (object number "1") is specified as an object from an external device such as a robot, a structural analysis on the object data so as to instruct the image analyze section 7 to recognize the lowest-level objects, namely, the marks A, B, C, and D (102, 104). Since each object is assigned with an object number, this instruction is effected by supplying the image analyze section 7 with the object numbers "4", "5", "6", and "7" of the marks A, B, C, and D.

Figure 11:
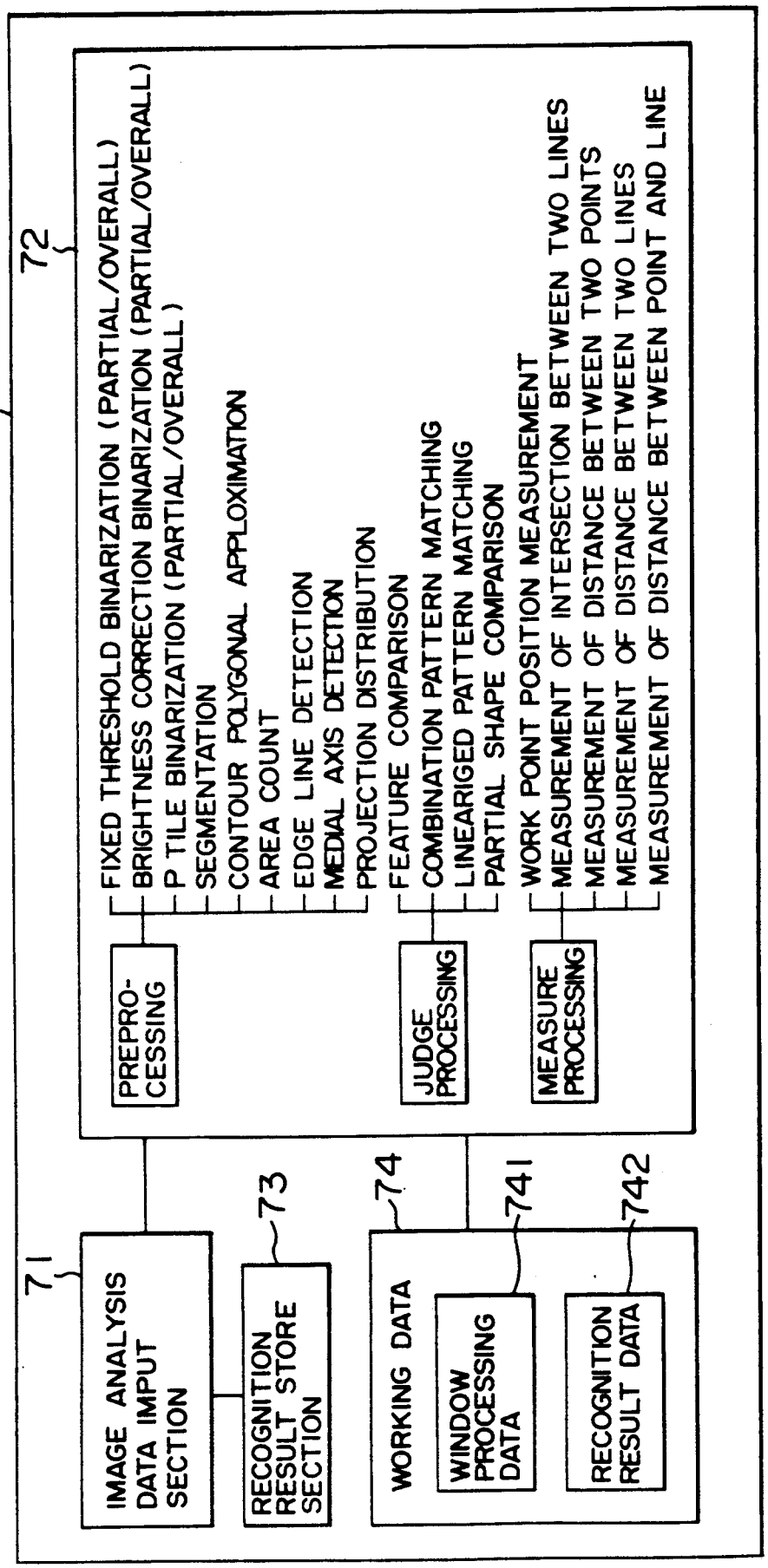
FIG. 11 is a diagram showing the structure of an image analyze section 7.

The image analyze section 7 is configured as shown in FIG. 11. An image analyze data input section 71 reads from the object data memory 5 object data specified by the object number sent from the image analysis controller 8 and then transmits the data to a group 72 of image processing modules. The image processing module group 72 includes modules for effecting various kinds of preprocessing, recognition, and measurements such that a module is selectively executed according to the kinds of the preprocessing, recognition, and measurement specified by the object data thus received.

Figure 12:
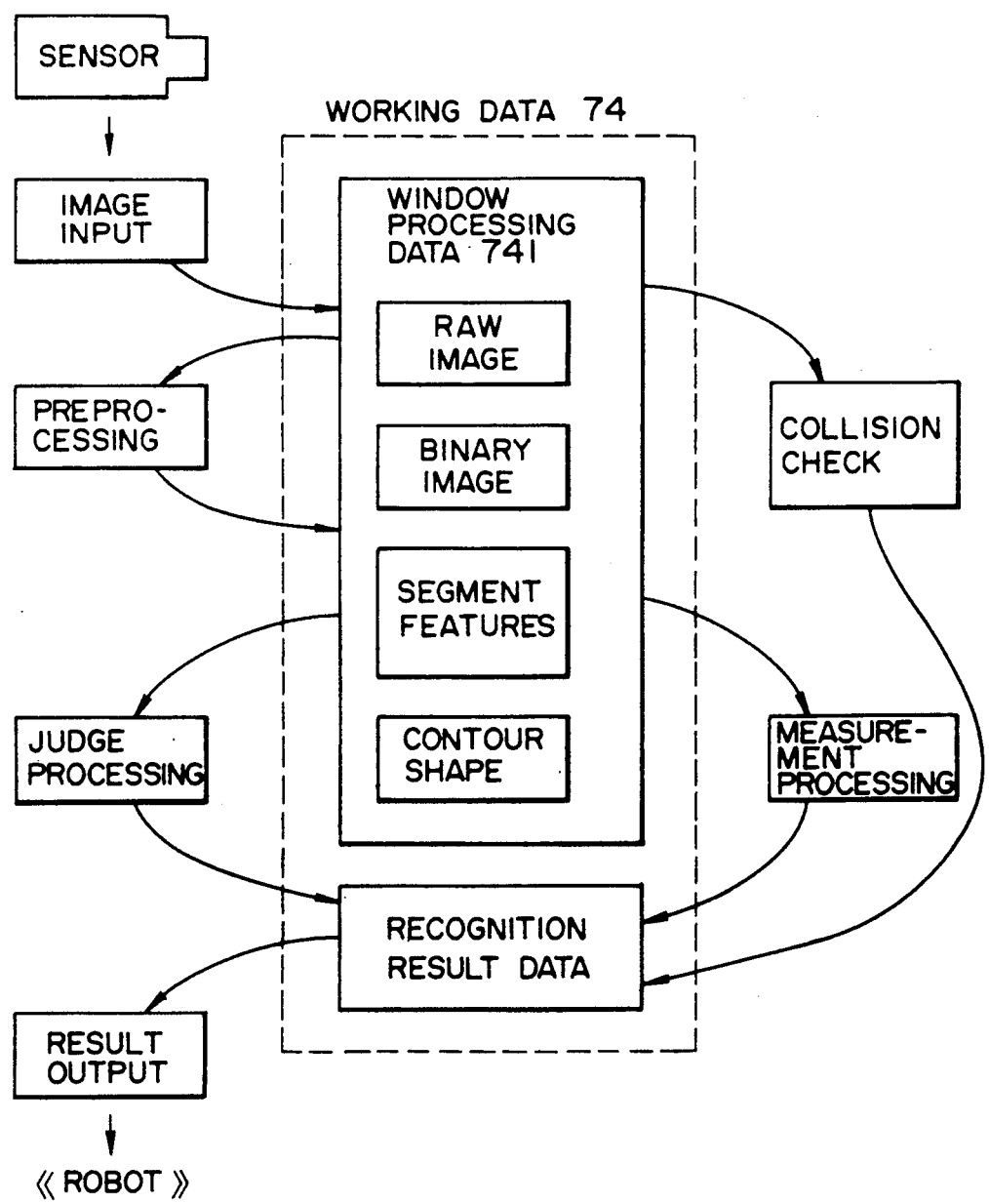
FIG. 12 is a diagram showing reference and write operations of working data.

Each processing of the preprocessing, recognition, and measurement includes a plurality of modules. In order to achieve an execution of a combination including arbitrarily selected modules, the modules at the respective hierarchic levels reference common working data 74 to proceed the processing. The working data 74 comprises, as shown in FIG. 12, window processing data 741 and recognition result data 742. The window processing data 741 is disposed for each window and includes a raw image or an original image, a binary image, a labeling result, and features and contour shapes of the respective segments. In addition, the recognition result data is disposed for each recognition object and includes the presence or absence, position, and measured dimensions of the recognition object.

Each module at the respective hierarchic levels achieves the reference and write operations on the working data as shown in FIG. 12; however, since all modules use the common working data, it is possible to execute a combination of arbitrary modules selected from the image processing module group 72 of FIG. 11.

The processing results are kept in a recognition result store section 73.

Figure 17:
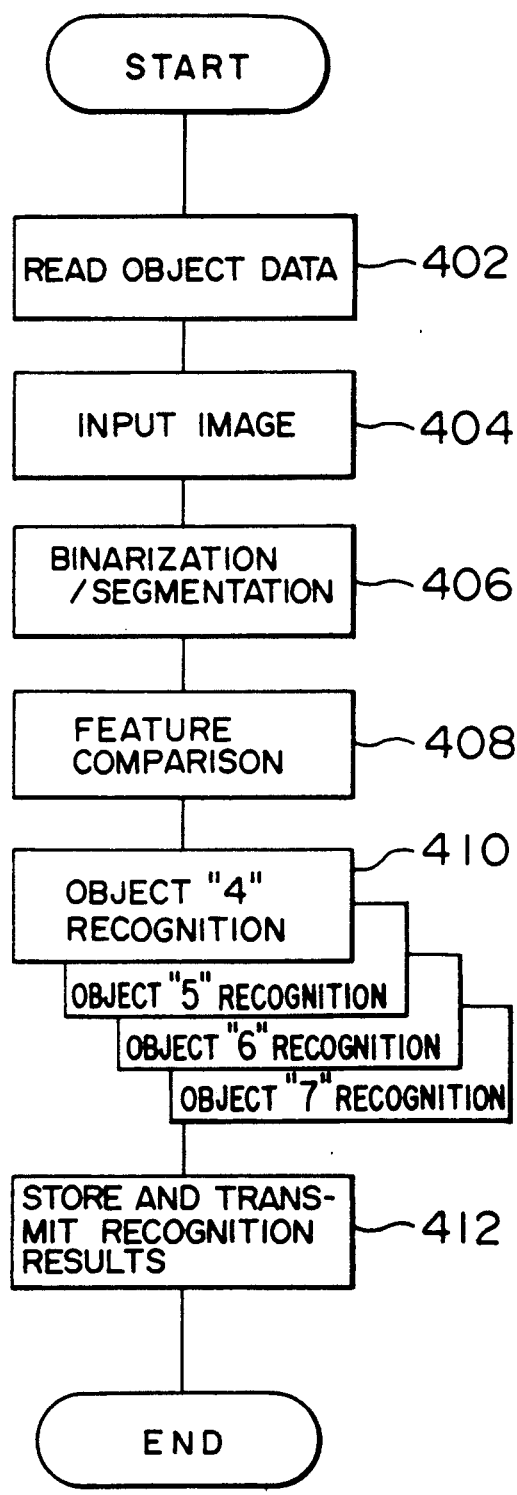
FIGS. 17, 18, and 19 are flowcharts respectively showing recognition procedures of an object in the image analyze section.

Next, procedures to recognize the objects "4", "5", "6", and "7" will be described with reference to FIG. 17.

The image analyze data input section 71 first reads object data associated with the object "4". Since there exist attribute data of the object, this section references the attribute data to achieve the image input, preprocessing, recognition, and measurement operations. As shown in FIG. 11, the image processing module group 72 includes various kinds of modules to execute the preprocessing and recognition, by using the modules of the kinds specified in the preprocessing algorithm item and the recognition algorithm item, a mark detection is accomplished through compare operations of the attribute values of the mark stored in the contour and shape item and the feature item.

In the example of FIG. 9, an image input is first conducted (404). Since the preprocessing item specifies the fixed binarization and segmentation, modules related thereto are selected and are then executed (406). Next, since the recognition item specifies the feature comparison, a module of the feature comparison is selected for execution (408). This results in judgement of presence or absence of the marks, namely, the objects "4", "5", "6", and "7" such that the result is kept in the recognition result store section 73 and the processing result is returned to the image analysis controller 8 (412).

On receiving the recognition result of the objects "4", "5", "6", and "7", the image analysis controller 8 judges to determine whether or not the object is the final object (106). Since this is not the case, the controller 8 checks to determine that the upper-level objects of the objects "4", "5", "6", and "7" include objects "2" and "3" (switches 1 and 2) (108, 102) and then supplies a recognition indication thereof to the image analyze section 7 (104).

Figure 18:
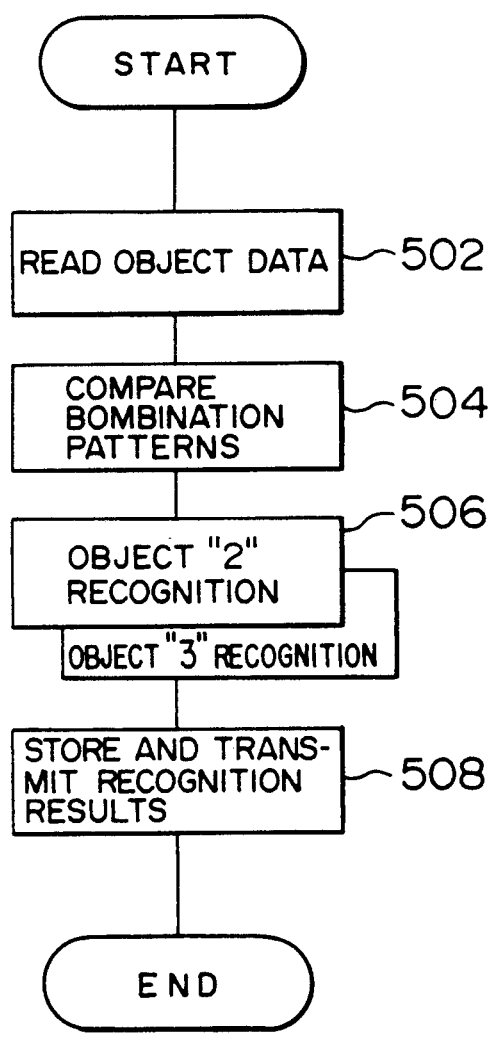

FIG. 18 shows recognition procedures to recognize the objects "2" and "3" of the image analyze section 7. When object data related to the objects "2" and "3" are read out (502), it is found that "4" and "5" as well as "6" and "7" are respectively specified as the lower-level objects and a combination pattern comparison or matching is designated as the recognition type. In consequence, among the group 72 of image processing modules, the combination pattern compare module is selected for execution (504) such that the detection results of the objects "4", "5", "6", and "7" kept in the recognition result store section 73 are referenced to judge for the determination of the presence or absence of the objects "2" and "3" (506). The results are kept in the recognition result store section 73 and the processing results are returned to the image analysis controller 8 (508).

On receiving the recognition results of the objects "2" and "3", the image analysis controller 8 judges whether or not the object is the final object (106). Since this is not the case, the image analysis controller 8 checks to determine whether or not the upper-level object of the objects "2" and "3" is the object "1" (switch panel) (108, 102) and then sends the recognition instruction to the image analyze section 7 (104).

Figure 19:
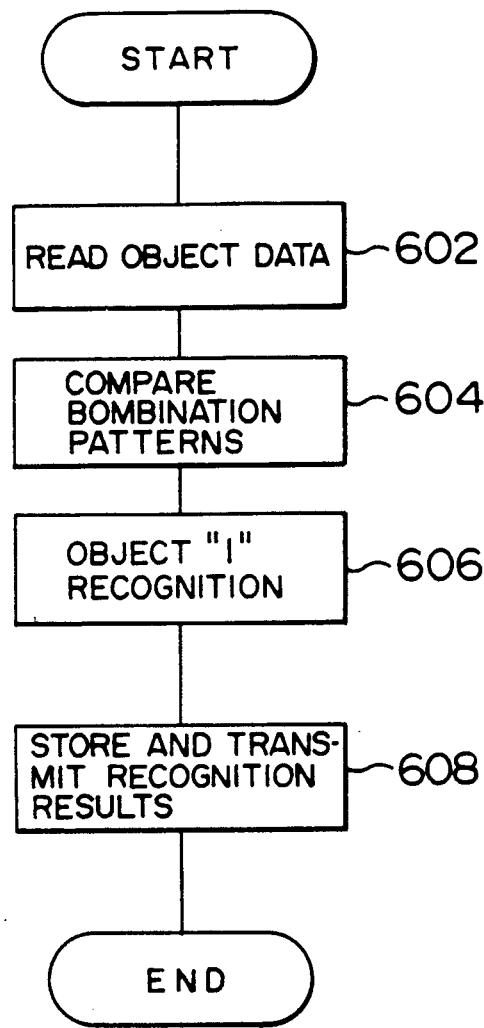

FIG. 19 shows a recognition procedure of the object "1" of the image analyze section 7. When the object data of the object "1" is read out (602), it is found that "2" and "3" are specified as the lower-level objects in the object data of the object "1" and that the combination pattern comparison is designated as the recognition type. Consequently, the combination pattern compare module is selected from the image processing module group 72 for execution (604). Referencing the detection results of the objects "2" and "3" kept in the recognition result store section 73, the presence or absence of the object "1" is judged (606) and then the result is kept in the recognition result store section 73 and the processing results are returned to the image analysis controller 8 (608).

The image analysis controller 8 loads the image analysis result memory 9 with the recognition result of the object "1" thus attained (106), and the image data input /output section 6 displays the result on the monitor 1 (110).

FIG. 13 shows in summary the command sequence to be effected between the image analysis controller 8 and the image analysis section 7 in response to the indication supplied from an external device such as a robot.

As described above, it is possible to recognize a complicated object, like the switch panel of FIG. 9, constituted with a plurality of lower-level objects.

In this example, the structure of the objects includes marks as the lowest-level objects, switches as object having the next upper level, and the switch panel as the object having the upper-most level. Since the user generally specifies lower-level objects for an object as shown in FIG. 5, two switches are specified in this case as the lower-level objects of the switch Panel and then marks are designated as the lower-level objects of the switches. In consequence, in order to determine the lowest-level object, it is necessary to analyze relationships between all objects, which is achieved by the image analysis controller 8. The procedure of the analysis is conducted as shown in FIG. 14.

That is, object data like those of FIG. 10 are obtained from the object data memory 5 (202) so as to determine whether or not there exist lower-level objects (204). If there exists any lower-level object, object data thereof is read from the memory 5 (206) and then the presence or absence of another lower level object is checked (204). In this fashion, for example, based on the object number "1" of FIG. 9, object data are read out for the lower-level object numbers "2" and "3" and then for the lower-level object numbers "4", "5", "6", and "7" so as to finally judge to determine the lowest-level objects (208). Through these operations, the relationships between all objects can be analyzed, namely, a complex object like that of FIG. 10 is recognized by use of the procedure of FIG. 8.

Incidentally, in the example above, the description has been given of a case of a switch panel. This operation is employed in a case where a switch to be applied to, for example, an operator's panel of an air conditioner by use of an apparatus such as a robot so that an inspection is conducted by means of the image recognition to determine whether or not the switch is assembled and is arranged in a regular fashion. Although this technology is particularly effective when recognizing an object which is represented in various configurations depending on a combination of a plurality of marks each having a simple shape, it is not restricted by such a panel assembly inspection, namely, it is naturally applicable to various usages.

FIG. 15 shows another example according to the apparatus above in which upper-level recognition objects are hierarchically specified by use of lower-level recognition objects.

Example 1 is a part having two components linked with each other by means of a hinge. Since the angle formed between the two components is not determined, the recognition cannot be achieved by comparing the shape of the entire part. For such a part, according to this apparatus, a window is set in the periphery of each hole of the two components so as to assume the inner hole as a point object such that the entire part is defined as a compound including points represented as point objects to be the lower-level objects.

Example 2 is a case where a position detection is effected on an IC having pins in four directions. In this case, a sequence of pins in each direction is set as a stripe object so as to first obtain the center of the pin sequence. Next, there is defined a compound including points in which the center point between two opposing stripe objects is set as a lower-level object. The compound including points is reduced to a line object for which the starting and ending points are determined; in consequence, there is defined a compound of two lines in which two compounds each including points are set as lower-level objects. An intersection between the two lines is the center position of the IC.

Example 3 is a case where a pattern width and a position of the printed circuit board are measured. In this case, edges on both sides of the pattern are defined as line objects so as to further define a compound of two lines with these two lines set as lower-level objects, which enables the pattern width and the position to be obtained.

Example 4 is a case where the type is judged depending on a combination of a plurality of elements like in the case of a segment character. In this operation, each element of the segment is defined as an amorphous object and an entire character is defined as a congregation of a plurality of objects, thereby judging the type thereof.

The objects above are conventionally recognized by a dedicated program; however, according to this apparatus, such an object can be specified as a combination of particular lower-level objects; in consequence, the number of process steps required for the development of a system can be greatly reduced.

As already shown by the examples above as well as in FIG. 7, there exist various kinds of object, and although each attribute may be inputted through the item data input section 62, all attributes need not be necessarily inputted depending on the object. For example, the switch recognition is conducted according to the presence or absence of the marks as the lower-level objects, and hence the image preprocessing is not necessary in the recognition of the switch. In this situation, the operation to be achieved by the user to specify the objects can be simplified through the following operations. When a compound object is specified as a type in a menu to specify a type of an object, a menu to specify a type of preprocessing is not displayed.

Figure 20:
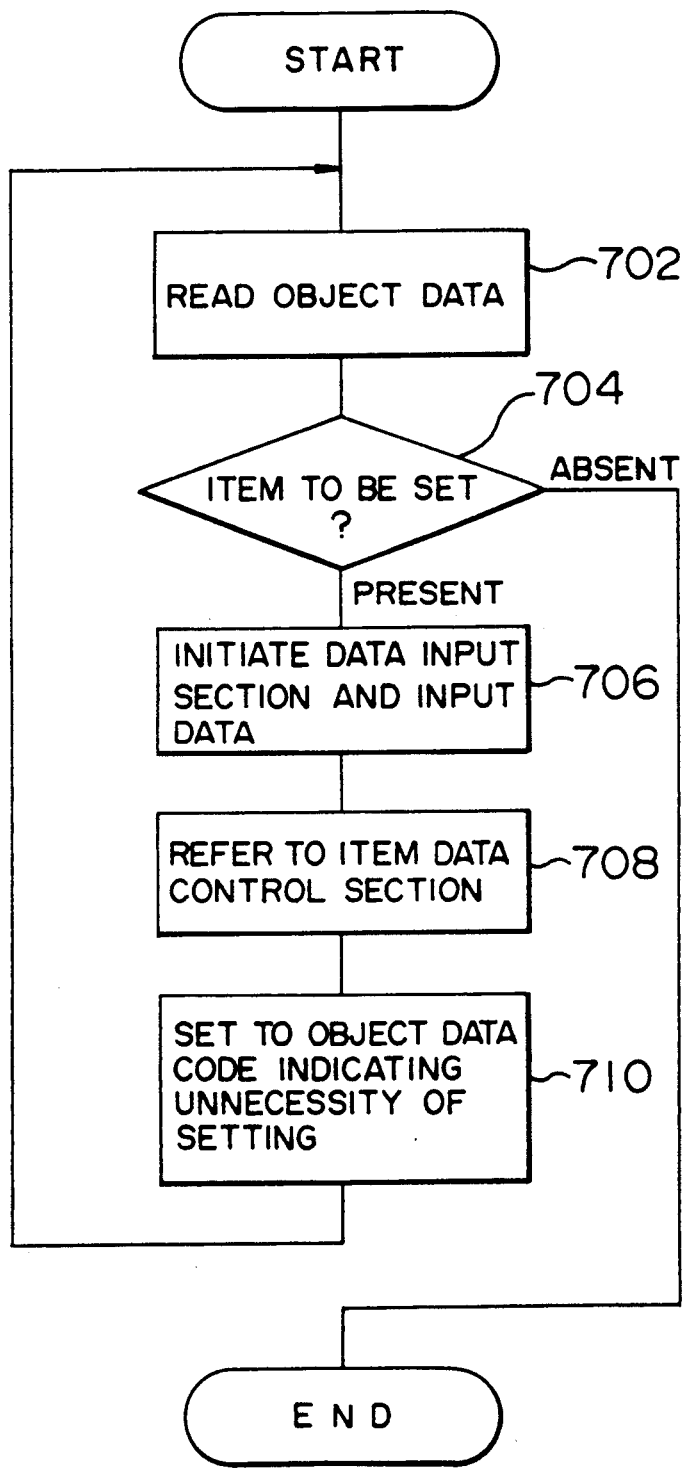
FIG. 20 is a flowchart showing a procedure to change necessary specification items depending on a type of the recognition object.

As described above, depending on the type of the recognition object, the change of the necessary specification items can be achieved through the procedure of FIG. 20. First, the input control unit 61 refers to the object data memory 5 (702) so as to check for determination of items not set in the object data memory 5 (704) and then initiates the item data input section 62 corresponding to the items, thereby inputting data (706). The input data control unit 63 is loaded with the necessary items and unnecessary items to be specified for each item, namely, when the pertinent item is specified, the items to be necessarily specified can be determined. In consequence, when data of an item is inputted, the input control section 61 stores the data in the object data memory 5 and then refers to the item data control unit 63 (708) so as to store the specification unnecessity codes in the object data memory 5 for the unnecessary items to be specified when the pertinent item is specified (710). This provision enables the input control section 61 to check the items of the object data memory 5 so as to initiate the item data input section 62 only for the items for which the data is already set or for the items other than those set with the specification unnecessity codes. In consequence, for the user, an input operation is automatically guided only to input the necessary items depending on the recognition object.

Description has been given of an example in which object data is interactively inputted by use of the monitor 1 and the keyboard 2; furthermore, it is also possible to supply the object data through the communication line 12 or from the storage 13 so as to input in an interactive fashion items other than those inputted in the operation above. The object data input/output section 6 includes, as shown in FIG. 3, the communication interface 64 and the storage interface 65 such that the input control section 61 receives data from external devices via these interfaces. The input control section 61 stores the inputted data in the object data memory 5. After the data is stored in the object data memory 5, there does not exist any difference between the data items supplied from the keyboard 2, the communication interface 64, and the storage interface 65; in consequence, the input control section 61 can guide the user to input only the items which have not been set according to the method described above. In this fashion, it is possible to input from an external file at a time the data which can be beforehand determined. This reduces the number of data input steps to be effected by the user.

In addition, although the image processing module group 72 of FIG. 11 includes various image processing modules classified by functions; there may be disposed a plurality of modules which are of the same function and of the different processing methods so that depending on a specified object, the module having the higher processing speed is selected therefrom.

Figure 16:
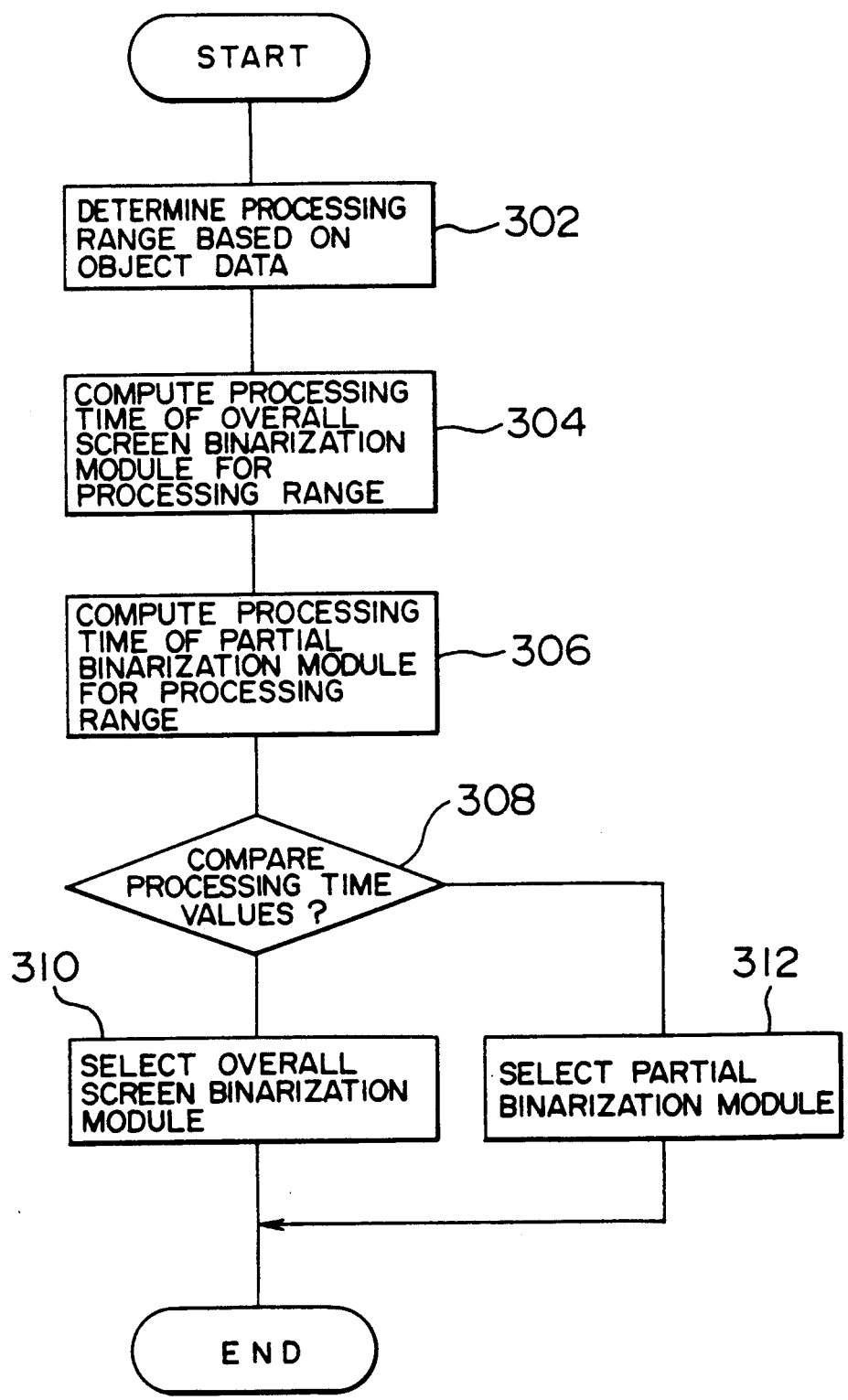
FIG. 16 is a diagram showing an example of a select procedure for selecting image processing modules.

FIG. 16 shows this processing procedure. In this example, the binarization or thresholding modules include an overall screen binarize module and a partial binarize module. In the overall binarize module, the entire content of the multi-value image memory undergoes a binarize or threshold operation by use of a specified threshold value, whereas the partial binarize module effects a binarize operation in a computer integrated with a program, which achieves the binarize operation of a particular range of the multi-value image memory with a specified threshold value. Since the overall screen binarize module processes the multi-value image memory by means of a dedicated circuit, the execution is constantly achieved at an interval of 16.7 milliseconds. In contrast, the partial binarize module processes the multi-value image memory in a pixel-by-pixel fashion in a computer; consequently, for a small range specified for the binarization, the processing time is reduced, whereas for a large range of the binarization, a long processing time is required. For example, assuming that ten microseconds are required to binarize one pixel, in a case where a range including 100 pixels represented as ten vertical pixels by ten horizontal pixels is to be binarized in a 256 pixels by 256 pixels multi-value image memory, the processing time is one millisecond; and for binarization of a range including 2500 pixels represented as 50 vertical pixels by 50 horizontal pixels, the processing time is 25 milliseconds. In consequence, it is advantageous that the range to be binarized is checked such that if more than 16.7 milliseconds are necessary for the partial binarize module to achieve the binarization, the overall screen binarize module is adopted; otherwise, the partial binarize module is employed. Since this apparatus has the range of the image to be processed as attribute data, the image analysis controller 8 checks the processing range (302) so as to select either one of the overall screen binarize module and the partial binarize module such that the shorter processing time is obtained and to execute the elected module (304, 306, 308, 310, 312). As a result, depending on an input object, the analysis results can be attained at a higher speed.

According to the present invention, a complex object including a plurality of regions can be detected. Among the objects in the material world, it is natural that such an object is complicated and is constituted with a plurality of portions as compared with a simple object including only a single region. In the object recognize apparatus according to the present invention, a complex object can be specified in a hierarchic fashion as a congregation of objects constituting the complex object; in consequence, when compared with the conventional recognition apparatus, the range of the recognition objects is greatly expanded. In this apparatus, since for each constitutent, geometric features and other items are respectively specified as recognition objects so as to be recognized in states at arbitrary locations, a complex object for which the position is not determined can be recognized.

In addition, as the recognition object becomes to be more complicated, the work specifying the recognition object is more complex and the number of steps for the specification is increased; however, according to the present invention, it is only necessary to input the necessary specification items depending on the recognition object, which considerably facilitates the specifying operation. Assume here that the number of the necessary specification items is half the total number of the specification items, the specification steps is also reduced by 50 percent according to the present invention.

Furthermore, processing modules are selected for execution depending on the object to be recognized, and hence the execution speed can be increased, or the processing time required therefor can be reduced.

While the present invention has been described with reference to the particular illustrative embodiments, it is not restricted by those embodiments but only by the appended claims. It is to be appreciated that those skilled in the art can change or modify the embodiments without departing from the scope and spirit of the present invention.

We claim:

1. An object recognition apparatus comprising:
   image input means for imaging an object an arbitrary position so as to input an image;
   means for specifying a recognition object as a set including a plurality of lower-level recognition objects;
   means for setting, for each of said lower-level recognition objects, at least a preprocessing operation of said each lower-level recognition object, features and contour shape of said each lower-level recognition object as attribute data corresponding to a judgment operation of said each lower-level recognition object and orientation base, position base, measurement items, collision check and coordinate conversion parameters as optional data of said each lower-level recognition object;
   means for performing a processing for said each lower-level recognition object according to said preprocessing operation, said judgment operation and said measurement items of said each lower-level recognition object;
   means for obtaining geometric features from said inputted image by performing a preprocessing according to said preprocessing operation of said each lower-level recognition object;
   means for effecting a judgment and detection of said lower-level recognition objects by comparing said geometric features obtained from said inputted image to features and contour shape of said each lower-level recognition object corresponding to said judgment operation; and
   means for detecting a recognition object including said lower-level recognition objects on the basis of results of said detection effected on said each lower-level recognition level object.

2. An object recognize apparatus according to claim 1 further including:
   means for retrieving the lower-level recognition objects constituting said recognition object; and
   means for effecting the detection beginning from a lower-level recognition object based on a retrieval result so as to finally detect upper-level recognition objects constituted with the lower-level recognition objects.

3. An object recognize apparatus according to claim 1 wherein types of said lower-level recognition objects includes a plane object having an area with an arbitrary shape, a line object, a point object, a stripe object having band-like pattern items with a predetermined distance therebetween, and an amorphous object not having a particular shape.

4. An object recognize apparatus according to claim 3 wherein:
   said types of recognition objects specified as a set of lower-level recognition objects include a compound of two points, a compound of a point and a line, a compound of two lines and a compound of a plurality of objects; and
   wherein the compound of two points is treated as a line object including the two points respectively as a starting point and an ending point, the compound of a point and a line is handled as a line object defined by a perpendicular drawing from the point onto the line, and the compound of two lines is treated as point object defined by an intersection of the two lines or as a line object defined by a distance between the two lines,
   whereby the recognition objects are defined in a hierarchical structure including lower-level objects of recognition objective items specified as a set of recognition objects.

* * * * *